Nov. 21, 1939.  C. B. POOLER  2,180,608
BAG TESTING DEVICE
Filed April 14, 1937

INVENTOR
CECIL B. POOLER
BY L.A.Paley
ATTORNEY

Patented Nov. 21, 1939

2,180,608

UNITED STATES PATENT OFFICE 2,180,608

BAG TESTING DEVICE

Cecil B. Pooler, Riverside, Ill., assignor to United States Gypsum Company, Chicago, Ill., a corporation of Illinois Application April 14, 1937, Serial No. 136,705

2 Claims. (Cl. 73—51)

This invention relates to testing devices, and has reference more particularly to testing devices suitable for determining the rupture points of paper bags for containing plaster, cement, lime or other powdered material.

In the past, it has been customary for manufacturers of paper bags for the shipment of powdered materials, to test such bags to determine points of weakness. These weak points in the bags can then be corrected by the proper adjustment of the machines which produce the bags. This testing has commonly been done by a workman repeatedly lifting a filled bag to waist height and dropping it on the floor until failure of the bag results. This method of testing is laborious and the workmen are reluctant to lift the bags to the same height each time, with the result that the testing method is inaccurate.

An object of this invention, therefore, is to provide a mechanical method of lifting and dropping the filled bags to avoid the labor and expenses of hand lifting.

Another object of the invention is to provide an accurate method of testing filled bags which will give true test data on the weak points of the bag.

A further object of the invention is to provide a simple and inexpensive apparatus for carrying out the test method; also to improve bag testing methods and apparatus in other respects hereinafter specified and claimed.

Figure 1:
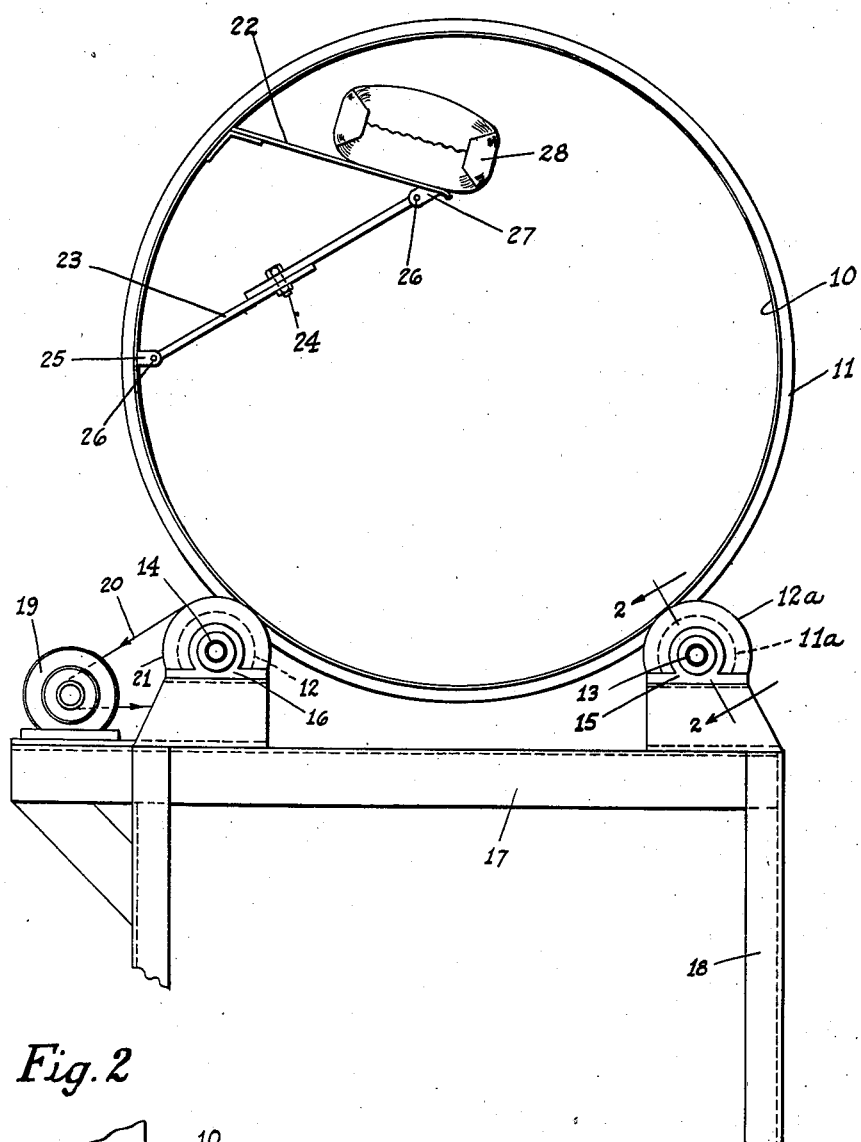
Figure 2:
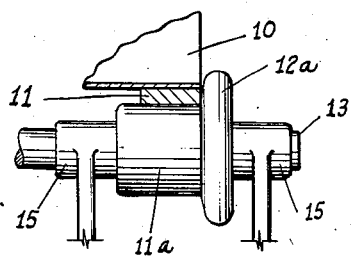

Reference is to be had to the accompanying drawing forming a part of this specification, in which Fig. 1 is a side elevation of the testing device, and Fig. 2 is a sectional fragmentary view through the device taken on line 2—2 of Fig. 1.

Referring to the drawing by numerals, the testing device comprises a rotatable cylinder 10 having a tire or rolling ring 11 at each end. A pair of rollers 11a and 12 having annular flanges 12a support each of the tires 11, said rollers being rigidly secured on shafts 13 and 14, respectively, the latter being rotatably mounted in suitable bearings 15 and 16, respectively. A suitable table framework 17 supports the bearings 15 and 16, and is in turn supported on the floor by standards 18. A motor 19 is also supported on the table framework 17, and is connected by a chain or other driving element 20 to a sprocket wheel 21 secured to the shaft 14 so as to accomplish the continuous rotation of the cylinder 10.

Rigidly mounted within the cylinder 10 is a shelf 22 which extends chordally part way across the cylinder. A two piece strut 23 is hinged at one end on a pivot pin 24 which is secured to a bracket 25 fixed to the inside of the cylinder 10. The other end strut 23 is pivotally mounted on a pin 26 secured to a bracket 27, the latter being secured to the underside of shelf 22 adjacent the end thereof. The shelf 22 picks up a filled bag 28 as the cylinder 10 rotates in a clockwise direction, until it reaches a high point where the bag slides off the shelf and falls to the bottom of the cylnder 10. The bag slides along the cylinder after dropping from shelf 22 and the resistance of the bag to scuffing is noted. This is repeated as a rotation of about 6 R. P. M. until the bag is ruptured and the point of rupture and scuffing resistance is noted. The manufacturing process and machinery for the bags is then improved until the bag is equally strong at all points as far as possible. It is obvious that my improved method and device will produce reproducible test results which will prove highly important to the bag manufacturer in improving his product.

I would state in conclusion, that while the illustrated example constitutes a practical embodiment of my invention, I do not wish to limit myself precisely to these details, since manifestly the same can be considerably varied without departing from the spirit of the invention as defined in the appended claims.

Having thus described my invention, I claim as new and desire to secure by Letters Patent:

1. In a bag testing device, a cylinder mounted for rotation about a horizontal axis, a single bag supporting member mounted within said cylinder and adapted upon rotation of said cylinder to repeatedly lift a filled bag to a predetermined height and repeatedly drop said bag from said height until said bag is ruptured, said cylinder being arranged to permit said bag to slide about a major portion of the inside periphery of said cylinder after each drop.

2. In a bag testing device, a cylinder arranged to rotate about a horizontal axis, a single shelf positioned chordally within said cylinder and adapted during rotation of said cylinder to repeatedly lift a filled bag to a predetermined height and repeatedly drop said bag from said height until said bag is ruptured, a strut secured between said shelf and said cylinder, and means for changing the length of said strut so as to vary the position of said shelf, the major portion of said cylinder being free of obstructions to permit sliding of said bag for measuring scuffing resistance of said bag.

CECIL B. POOLER.